US012025300B2

(12) United States Patent
Li et al.

(10) Patent No.: US 12,025,300 B2
(45) Date of Patent: Jul. 2, 2024

(54) LAMP

(71) Applicants: SUZHOU OPPLE LIGHTING CO., LTD., Suzhou (CN); OPPLE LIGHTING CO., LTD., Shanghai (CN)

(72) Inventors: Xiaoshan Li, Suzhou (CN); Liwei Zhao, Suzhou (CN); Songjing Jiang, Suzhou (CN); Yu Mao, Suzhou (CN)

(73) Assignees: SUZHOU OPPLE LIGHTING CO., LTD., Jiangsu (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 18/209,823

(22) Filed: Jun. 14, 2023

(65) Prior Publication Data

US 2023/0324034 A1 Oct. 12, 2023

Related U.S. Application Data

(63) Continuation of application No. PCT/CN2021/136936, filed on Dec. 10, 2021.

(30) Foreign Application Priority Data

Dec. 14, 2020 (CN) ......................... 202011466280.7
Dec. 14, 2020 (CN) ......................... 202023006094.3

(51) Int. Cl.
*F21V 21/35* (2006.01)
*F21V 21/005* (2006.01)
(Continued)

(52) U.S. Cl.
CPC ............ *F21V 21/35* (2013.01); *F21V 21/005* (2013.01); *F21V 21/008* (2013.01); *F21V 23/005* (2013.01)

(58) Field of Classification Search
CPC .... F21V 23/005; F21V 21/008; F21V 21/005; F21V 21/35
See application file for complete search history.

(56) References Cited

U.S. PATENT DOCUMENTS 7,621,753 B1 * 11/2009 Pai ..................... H01R 13/6205 439/39
9,574,755 B1 * 2/2017 Gutierrez ............. F21V 21/005
(Continued)

FOREIGN PATENT DOCUMENTS

CN 208986225 U 6/2019
CN 210842948 U 6/2020
(Continued)

OTHER PUBLICATIONS

Innovation Q+ NPL Search (Year: 2023).*
(Continued)

*Primary Examiner* — Anabel Ton
(74) *Attorney, Agent, or Firm* — Arch & Lake LLP

(57) ABSTRACT

The present disclosure discloses a lamp including a light source module, a first magnetic attraction conductive member, a magnetic attraction power interface member and a first sleeve, wherein the light source module includes a substrate and a light emitter connected to a side of the substrate; the first magnetic attraction conductive member is electrically connected to an end of the light source module; the magnetic attraction power interface member is configured to be electrically connected to a power line, and magnetically attracted and electrically attached to the first magnetic attraction conductive member; the first sleeve is configured to be installed to an installation basic structural member, and has a threading hole for threading the power line and an accommodation cavity, the magnetic attraction power interface
(Continued)

member and the first magnetic attraction conductive member are both installed within the accommodation cavity.

15 Claims, 5 Drawing Sheets

(51) Int. Cl.
*F21V 21/008* (2006.01)
*F21V 23/00* (2015.01)

(56) References Cited

U.S. PATENT DOCUMENTS

| | | | | |
|---|---|---|---|---|
| 11,841,118 | B1 * | 12/2023 | Jacobs | F21S 2/005 |
| 2021/0404609 | A1 * | 12/2021 | Wang | F21V 29/70 |

FOREIGN PATENT DOCUMENTS

| | | | |
|---|---|---|---|
| CN | 112483912 | A | 3/2021 |
| CN | 213810069 | U | 7/2021 |
| GB | 2447792 | A | 9/2008 |
| GB | 2447792 | B | 4/2012 |

OTHER PUBLICATIONS

International Search Report of PCT Application No. PCT/CN2021/136936 dated Feb. 23, 2022 with English translation, (4p).

* cited by examiner

LAMP

CROSS-REFERENCE TO RELATED APPLICATIONS

This application is based upon and claims the priority of PCT patent application No. PCT/CN2021/136936 filed on Dec. 10, 2021 which claims priority to the Chinese patent application No. 202011466280.7, filed on Dec. 14, 2020 and the Chinese patent application No. 202023006094.3, filed on Dec. 14, 2020, the entire contents of which are hereby incorporated by reference herein for all purposes.

TECHNICAL FIELD

The present disclosure relates to the technical field of lighting equipment, especially to a lamp.

BACKGROUND

Illumination equipment, such as lamp, is an important tool in people's daily life and work. There are numerous types and lighting modes of lamps. For example, hanging lamps are usually installed in high place, such as on the roof, which provide an illumination by emitting light downward. As another example, ground lamps are usually installed on the ground, which provide an illumination in a manner of emitting light upward.

SUMMARY

The present disclosure discloses a lamp.

The lamp disclosed in the present disclosure may include a light source module including a substrate and a light emitter connected to a side of the substrate; a first magnetic attraction conductive member electrically connected to an end of the light source module; a magnetic attraction power interface member configured to be electrically connected to a power line and magnetically and electrically connected to the first magnetic attraction conductive member; a first sleeve configured to be installed on an installation basic structural member and provided with an threading hole for threading the power line and an accommodation cavity, wherein the magnetic attraction power interface member and the first magnetic attraction conductive member are both installed within the accommodation cavity, and the first magnetic attraction conductor being capable of rotating relative to the first sleeve in a direction about the magnetic attraction direction.

It is to be understood that the foregoing general description and the following detailed description are exemplary and explanatory only and are not restrictive of the disclosure.

BRIEF DESCRIPTION OF THE DRAWINGS

The accompanying drawings described herein are used to provide a further understanding of the disclosure, and constitute a part of the disclosure. The schematic examples of the disclosure and the descriptions thereof are used to illustrate the disclosure, and do not constitute an improper limitation of the disclosure. In the drawings.

DETAILED DESCRIPTION

Figure 1:
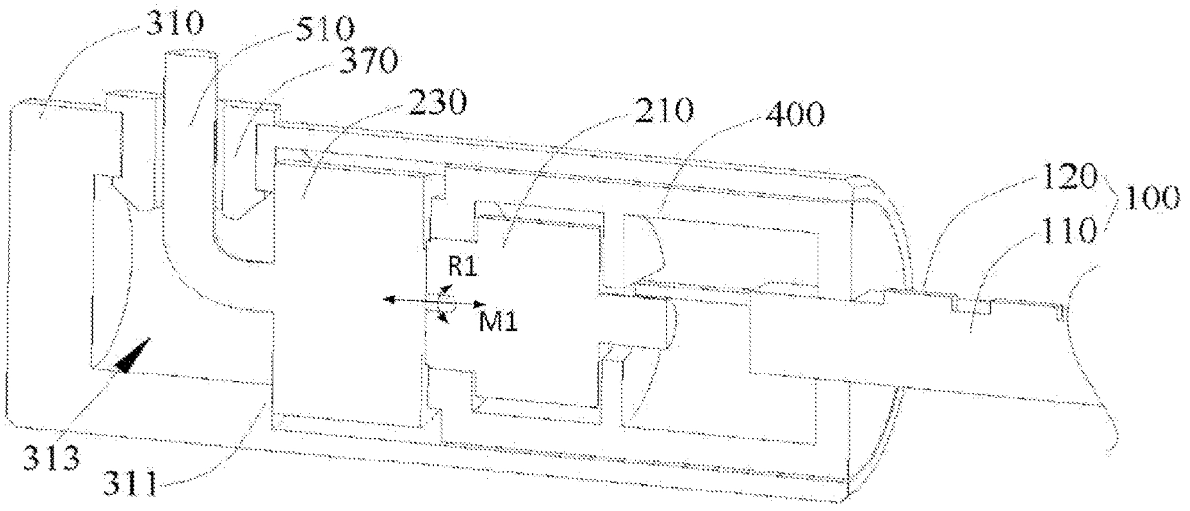
FIG. 1 is a schematic cross-section al view of a part of a structure of a lamp disclosed in an example of the present disclosure.
Figure 2:
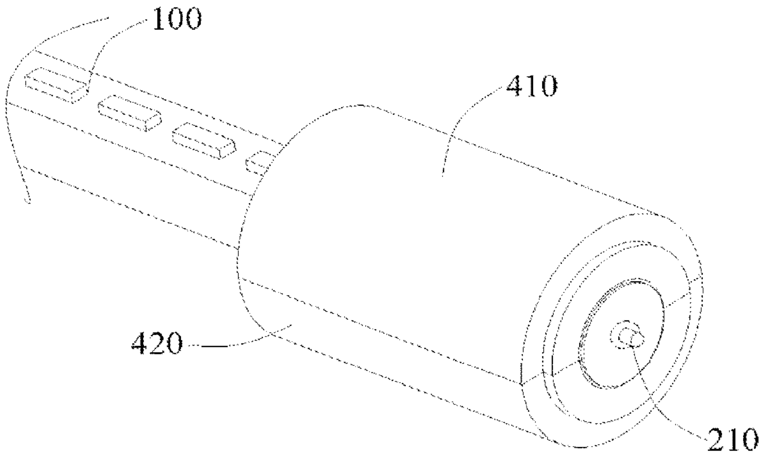
FIG. 2 is a schematic assembly diagram of a light source module in a lamp disclosed in an example of the present disclosure.
Figure 3:
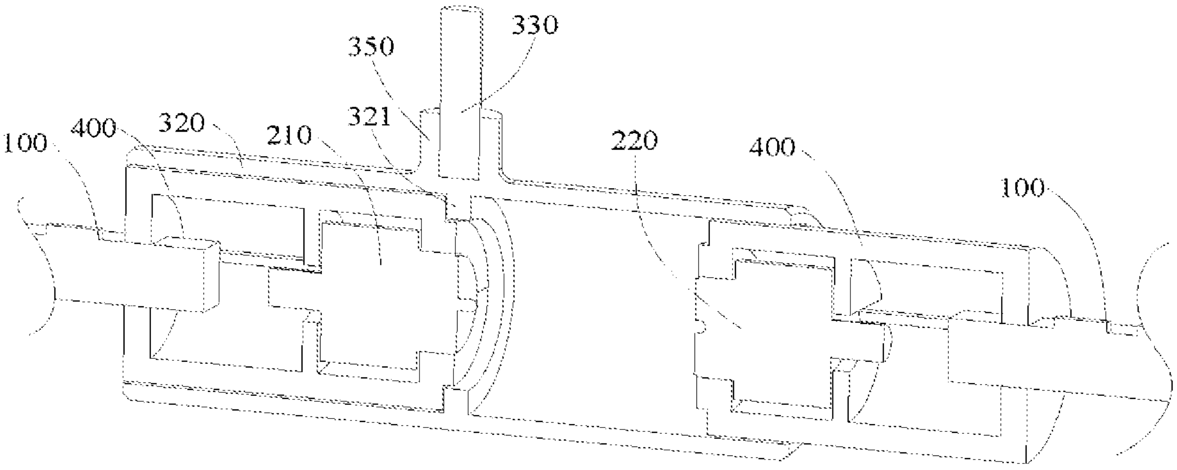
FIG. 3 is a schematic view showing two adjacent light source modules in a disconnected state in a lamp disclosed in an example of the present disclosure.
Figure 4:
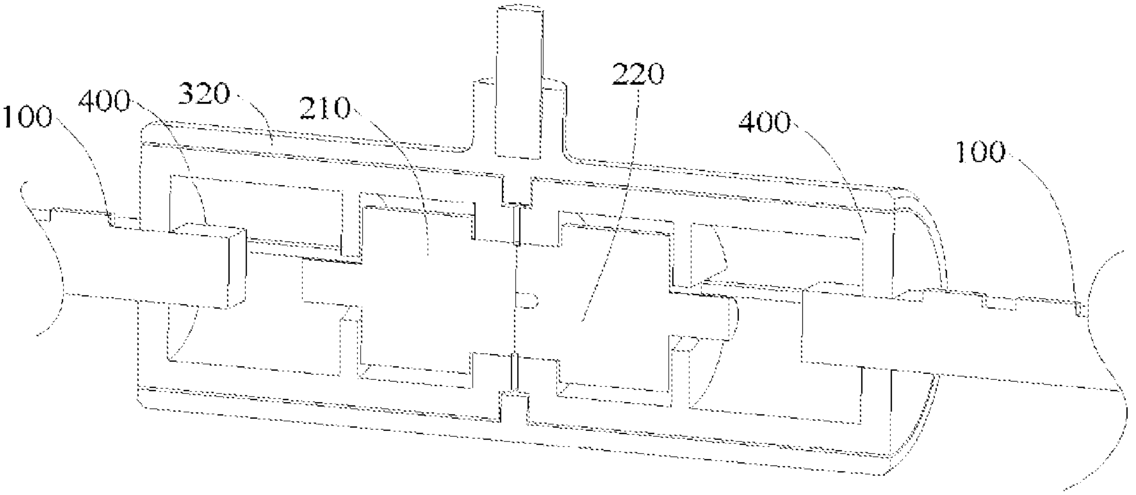
FIG. 4 is a schematic view showing two adjacent light source modules in a connected state in a lamp disclosed in an example of the present disclosure.
Figure 5:
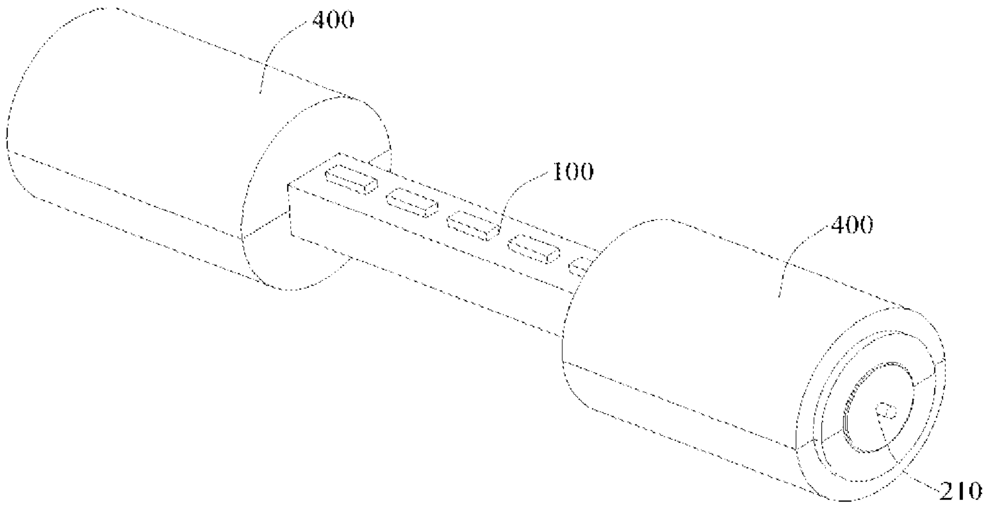
FIG. 5 is a schematic view of a part of a structure of a lamp disclosed in an example of the present disclosure.

In order to make objects, technical solutions, and advantages of the disclosure more clear, the technical solutions of the prevent disclosure will be clearly and completely described in connection with the examples and the corresponding drawings of the present disclosure. Apparently, the described examples are just a part but not all of the examples of the disclosure. All other examples obtained by a person of ordinary skill in the art based on the examples of the present disclosure without inventive effort are within the scope of the present disclosure.

Hereinafter, the technical solutions disclosed in various examples of the present disclosure are described in details by reference to the accompanying drawings.

Description of Reference Numerals used in this disclosure may include: 100—Light source module, 110—Substrate, 120—Light emitter, 210—First magnetic attraction conductive member, 220—Second magnetic attraction conductive member, 230—Magnetic attraction power interface member, 310—First sleeve, 311—Step section, 313—Accommodation cavity, 315—Threading hole, 320—Second sleeve, 321—Stop rib, 330—Installation member, 350—Installation section, 370—Flexible protective jacket, 400—Securing member, 410—First connection section, 420—Second connection section,

510—Power line, 530—Conductive rail.

Ceiling washer lamps are usually installed on the wall and face the ceiling, which provide an illumination in a manner of illumining the ceiling and emitting light with aids of the ceiling. After the installation of ceiling washer lamps is completed, the orientation or angle of lamps cannot be adjusted, the lighting effect is monotonous, and the user experience is poor.

As shown in FIG. 1 to FIG. 8, an example of the present disclosure discloses a lamp comprising a light source module 100, a first magnetic attraction conductive member 210, a magnetic attraction power interface member 230, and a first sleeve 310.

The light source module 100 is a component for emitting light in a lamp, which comprises a substrate 110 which can specially be a circuit board and a light emitter 120. Optionally, the substrate 110 has a rigid structure. In this case, the light emitter 120 can be located at an installation position on the substrate 110 to illuminate a predetermined region when a power is supplied to the light emitter. It is to be noted that the rigid structure refers to the substrate 110 being made of a rigid material, and the substrate is hardly deformed in normal use. However, during the production process, the substrate 100 can deform to an extent under the set conditions by adjustments, such as sufficient external force or high temperature, due to the corresponding requirements of production, so that it can be formed into a specific shape and structure according to conditions, such as design requirements and customer requirements, and it is not absolutely un-deformable.

The substrate 110 can be a bar-shaped structural member. Or, the substrate 110 can be a plate-shaped structural member. The shape and size of the substrate 110 can be determined in accordance with practical conditions, such as usage scenario and customer requirements. Optionally, the substrate 110 can be made from metal materials. On the one hand, it is convenient to process, and the cost is relatively low. In addition, the members made from metal materials has relatively long working life and good appearance effect.

To further enhance the structural strength of the substrate 110 and prevent the substrate 110 from bending, deformation, or the like, the substrate 110 can optionally be a structural member made of aviation aluminum materials, that is, the substrate 110 can be formed using aviation aluminum materials so that the substrate 110 has an increased structural strength. Moreover, this substrate 110 will hardly rust after used for a period of time, and thus has a relatively long service life. During the processing of the substrate 110, the substrate 110 can have a small thickness to further reduce the installation space occupied by the lamp. In addition, since the aviation aluminum materials have relatively high tensile strength, and thus the substrate 110 with a smaller thickness can also have a relatively high structural strength, it can substantially ensure that the substrate 110 will not deform during the use of the lamp. In addition, in the case that the thickness dimension of the substrate 110 is relatively small, the aesthetics of the lamp can be enhanced, the comprehensive competitive power of the product can be increased.

The light emitter 120 can be an LED light or other types of component with light emitting function. The parameters of the light emitter 120, such as size and nominal voltage, can be determined in accordance with the practical requirements, which are not limited herein. The light emitter 120 is connected to a side of the substrate 110. Specifically, the light emitter 120 can be installed on the surface of the substrate 110 in an embedded mode. In the case that the substrate 110 is a rigid structure, the substrate 110 can provide a stable installation base for the light emitter 120.

Further, the light emitter 120 can be lamp beads, and a plurality of light emitters 120 can be used to further improve the illumination effect of the whole lamp. Under the action of the plurality of the light emitters 120, the brightness of the whole lamp and the area of the illuminating area can be increased. Moreover, the plurality of the light emitters 120 can be disposed on the substrate 110 at intervals and electrically connected with each other to ensure that all the light emitters 120 can work normally under the action of an external power supply.

As set forth above, the substrate 110 can has a bar- or ring-shaped structure. Correspondingly, in the case that the substrates 110 are different in shape, the arrangement of the plurality of light emitters 120 can be determined in accordance with actual shape of the substrate 110. For example, in the case that the substrate 110 has a bar-shaped structure, the plurality of light emitters 120 can be arranged in single column and multiple rows. Or, the plurality of light emitters 120 can also be arranged in dual columns and multiple rows, or in multiple columns and multiple rows. Similarly, in the case that the substrate 110 has a ring-shaped structure, the plurality of light emitters 120 can be arranged in rings, wherein the number of the rings can be determined in accordance with actual conditions.

The first magnetic attraction conductive member 210 and the magnetic attraction power interface member 230 are structural members used in cooperation. The magnetic attraction power interface member 230 can magnetically co-operate with the first magnetic attraction conductive member 210 and form an electrical connection. During the installation of the lamp, the magnetic attraction power interface member 230 can electrically connected to the power line 510, that is, the cables, terminals, or similar structures within the magnetic attraction power interface member 230 can be connected to the power line 510, thereby introducing the power supply into the lamp.

Correspondingly, the first magnetic attraction conductive member 210 is electrically connected to an end of the light source module 100. Specifically, the first magnetic attraction conductive member 210 is electrically connected to the light emitter 120 and the substrate 110 is kept in an insulation state to improve the safety of the lamp and reduce the power consumption. The first magnetic attraction conductive member 210 can be connected to the light emitter 120 via conductive wire (not shown). By insulating the conductive member and the substrate 110 from each other, it can ensure that the substrate 110 can be in an insulation state during the operation of the lamp.

In the case of a plurality of light emitters 120 being provided, the plurality of light emitters 120 can be connected to each other via conductive members, such as conductive wires or etched lines. The conductive members can be disposed on the surface of the substrate 110, the light emitters 120 are installed on the surface of the substrate 110 on which the conductive member is disposed, and the light emitters 120 are electrically connected to the conductive member so as to transmit electrical energy to the light emitters 120 by the conductive member.

Due to the advantages of metal, such as good electrical conductivity, low cost, and low processing difficulty, the conductive member can be made of a metal material. The conductive member can be pre-formed during the processing of the light source module 100, and then integrated with the substrate 110 during the processing of the substrate 110. In the case that the conductive member is disposed on the surface of the substrate 110, the whole light source module 100 can have an increased structural strength to ensure that the whole lamp has good structural stability. Moreover, if a failure occurs in the lamp, the position at which the failure occurs can be quickly found by the conductive member disposed on the surface of the substrate 110 so as to facilitate the repair. Of course, the conductive member secured onto the surface of the substrate 110 can also be formed by other ways.

Optionally, the conductive member can be fixedly connected to the substrate 110 by pressure binding so that a high adhesion can be formed between the conductive member and the substrate 110 under a given pressure. Moreover, the conductive member has relatively low weight and small size so that the conductive member will not be substantially detached from the substrate 110. The size and number of the conductive members can be determined in accordance with actual conditions, such as the nominal current and number of the light emitters 120.

The first sleeve 310 is an installation structural member of the whole lamp. During the installation of the lamp, the lamp can be installed onto the installation basic structural member by the first sleeve 310. Specifically, the first sleeve 310 can be installed via threaded connections to an installation basic structural member, such as roof, ceiling, or wall.

Moreover, the first sleeve 310 further provides an installation base function for the magnetic attraction power interface member 230 and the first magnetic attraction conductive member 210. Specially, the first sleeve 310 has a threading hole 315 and an accommodation cavity 313, and the magnetic attraction power interface member 230 and the first magnetic attraction conductive member 210 are both installed within the accommodation cavity 313. More specially, the shapes and sizes of the first sleeve 310 and the accommodation cavity 313 can be determined in accordance with the shapes and sizes of the magnetic attraction power interface member 230 and the first magnetic attraction conductive member 210. As noted above, the magnetic attraction power interface member 230 can be electrically connected to the power line 510, the power line 510 can extend from outside the first sleeve 310 through the threading hole 315 into the first sleeve 310 to enable the power line 510 to interconnect with the magnetic attraction power interface member 230 located within the accommodation cavity 313, so that the power line 510 can supply a power to the light source module 100.

Moreover, the first magnetic attraction conductive member 210 installed within the accommodation cavity 313 can rotate relative to the first sleeve 310 in a direction R1 about the magnetic attraction direction Ml. Specifically, by designing the size of the first magnetic attraction conductive member 210 to be smaller than the internal size of the first sleeve 310, the first magnetic attraction conductive member 210 can rotate within the first sleeve 310; at the same time, even though the first magnetic attraction conductive member 210 rotates relative to the magnetic attraction power interface member 230, it can also ensure that both the magnetic-connection and the electrical-connection therebetween are relatively stable due to the magnetic connection between the first magnetic attraction conductive member 210 and the magnetic attraction power interface member 230.

Based on the above, to ensure that the first magnetic attraction conductive member 210 and the magnetic attraction power interface member 230 can both be installed into the accommodation cavity 313, and will not accidentally come out of the accommodation cavity 313, the first sleeve 310 is optionally a detachable cylindrical structural member comprising at least two parts which are detachably connected with each other and form the accommodation cavity 313. During the assembly process, the first magnetic attraction conductive member 210 and the magnetic attraction power interface member 230 can be firstly connected to a part of the first sleeve 310, and then the components of the first sleeve 310 can be assembled and integrated so as to ensure that the first magnetic attraction conductive member 210 and the magnetic attraction power interface member 230 can both form a stable fit relationship with the first sleeve 310.

Or, in the case that the substrate 110 is a rigid structural member, the first sleeve 310 is optionally an integral structural member with an installation port provided at an end of the first sleeve 310, the magnetic attraction power interface member 230 and the first magnetic attraction conductive member 210 can both be installed via the installation port into the accommodation cavity 313 of the first sleeve 310. Moreover, by arranging a first sleeve 310 at two ends of the substrate 110, respectively, in the case that the two first sleeves 310 are both installed onto the installation basic structural member, the position of the light source module 100 disposed between the two first sleeves 310 can be fixed so as to prevent the light source module 100 from moving along the distribution direction of the two first sleeves 310, thereby ensuring the formation of a stable fit relationship between the first sleeve 310 and the first magnetic attraction conductive member 210.

As noted above, the light emitter 120 can be electrically connected via the conductive member to the first magnetic attraction conductive member 210; the light emitter 120 and the conductive member can both be disposed on the surface of the substrate 110; and to prevent the conductive member and the light emitter 120 from electrical leakage during the operation of lamp, the conductive member and the light emitter 120 are both covered by a light-transmitting insulating layer. The light-transmitting layer can be a structure formed by curing a material, such as transparent insulating adhesive. During the processing of the light source module 100, after the light emitter 120 (and the conductive member) is fixed onto the substrate, the light-transmitting insulating layer can be formed outside the light emitter 120 (and the conductive member) by dipping process, brushing process, or spraying process, etc., and the thickness of the light-transmitting insulating layer can be determined in accordance with parameters, such as working current of the lamp. Moreover, the thickness of the light-transmitting insulating layer can be made as small as possible so as to minimize the hindering and weakening effect of the light-transmitting insulating layer on the light emitted by the light emitter 120, while the high safety of the lamp is ensured.

Optionally, in accordance with the actual requirements, such as usage scenario, the light-transmitting insulating layer can be formed to filter a light at a specific wave band. For example, parameters, such as the types and components of the light-transmitting insulating layer, can be changed to enable the light-transmitting insulating layer to filter the blue light with wavelength in a range of 400 nm to 480 nm) from the light emitted by the light emitter 120, so that it will be substantially not harm to human eyes even if the lamp disclosed in the example of the present disclosure is used for a long time. Or, the material of the light-transmitting layer can be changed to enable the light-transmitting insulating layer to produce a certain diffusion effect on the light.

More specially, the light-transmitting insulating layer can be an adhesive layer formed by curing a UV (Ultraviolet Ray) adhesive. The UV adhesive is not volatile, it cannot pollute the environment, and has a fast curing speed and a low demand for cuing conditions, which can increase the processing efficiency of the lamp. At the same time, the flammability of UV adhesive is low, which can further improve the safety of the lamp. Moreover, UV adhesives can be repeatedly applied and cured, which is convenient for the production and maintenance of the lamp.

When the aforesaid light source module 100 is used in a lamp, the conductive member can be electrically connected to the first magnetic attraction conductive member 210 so as to supply power for the light emitter 120. In the case that the substrate 110 is an insulation structure, the electricity will not be transmitted to the substrate 110 even if the conductive member is electrically-charged during the normal operation, so as to ensure that the substrate 110 have a good insulation during the operation of the lamp. As noted above, the substrate 110 can also be made of a metal material. In the case that the substrate 110 is a metal structure, other insulation structures, such as light-transmitting layer, can be disposed between the conductive member and the substrate 110, thereby ensuring a high insulation between the substrate 110 and the conductive member. In the case that the light-transmitting insulating layer is formed by an UV adhesive, a light-transmitting insulating layer disposed between the substrate 110 and the conductive member can further improve the reliability of the connection between the conductive member and the substrate 110.

An example of the present application discloses a lamp in which an electrical connection can be formed between the light source module 100 and the power line 510 via the magnetic attraction and electrical connection between the first magnetic attraction conductive member 210 and the magnetic attraction power interface member 230, and the first magnetic attraction conductive member 210 and the magnetic attraction power interface member 230 are both installed within the accommodation cavity 313 of the first sleeve 310, and the first sleeve 310 can be fixed onto the installation basic structural member, so that the installation of the lamp is completed. Moreover, the first magnetic attraction conductive member 210 can rotate relative to the first sleeve 310 in a direction about the magnetic attraction direction to change the orientation of the light emitter 120 of the light source module 100 connected to a side of the substrate 110, thereby changing the orientation of the light emitter 120 by allowing the first magnetic attraction conductor 210 to rotate relative to the first sleeve 310 if the user needs to adjust the light effect of the lamp, which allows the user to have a good experience.

Further, the lamp disclosed in the examples of the present application can further comprise a securing member 400, the end of the light source module 100 connected to the first magnetic attraction conductive member 210 and the first magnetic attraction conductive member 210 are both fixed within the securing member 400, and the securing member 400 is rotatably installed within the accommodation cavity 313. The securing member 400 can provide an auxiliary stop effect between the light source module 100 and the first magnetic attraction conductive member 210. In this case, even if the sizes of the first magnetic attraction conductive member 210 and the light source module 100 are different to an extent, it also can ensure that the first magnetic attraction conductive member 210 and the light source module 100 can both form a stable fit relationship with the first sleeve 310 via the securing member 400 to prevent the first magnetic attraction conductive member 210 from being stuck during the rotation which will adversely affect the normal use of the lamp.

The securing member 400 can be made of an elastic material, such as plastics. By elastically deforming the securing member 400 to an extent, the first magnetic attraction conductive member 210 can be installed into the securing member 400, and the connection therebetween will be stable. Or, the securing member 400 can also be made of a rigid material. It can include a plurality of components which are detachably connected to each other. And the shape of the securing member 400 is correspondingly designed in accordance with the shapes of the first magnetic attraction conductive member 210 and the light source module 100, thereby ensuring that the first magnetic attraction conductive member 210 and the light source module 100 cooperate with the securing member 400 in more close relationship. Of course, the securing member 400 is provided with an opening through which a portion of the first magnetic attraction conductive member 210 can extend out, or through which the magnetic attraction power interface member 230 can extend into the securing member 400, thereby ensuring the magnetic attraction power interface member 230 can be magnetically attracted and electrically connected to the first magnetic attraction conductive member 210.

In addition, in the case that the lamp comprises the securing member 400, the first magnetic attraction conductive member 210 and the light source module 100 can be previously integrated so that the light source module 100 and the first magnetic attraction conductive member 210 serve as a whole structural member during the assembly of the lamp. Correspondingly, the magnetic attraction power interface member 230 and the first sleeve 310 can also be integrated so that the assembly of the lamp can be modularized. In accordance with different demands, the lamp can comprise one or more light source modules 100.

Optionally, both the securing member 400 and the accommodation cavity 313 can be cylindrical structures, and the securing member 400 and the accommodation cavity 313 are in clearance fit. In this way, the rotation of the securing member 400 within the accommodation cavity 313 is relatively less difficult and smoother. Moreover, the assembly of the securing member 400 and the first sleeve 310 is also relatively less difficult in the above structure, so that the production efficiency of the lamp can be improved.

As noted above, the securing member 400 can comprise a plurality of components. Optionally, the securing member 400 comprises a first connection section 410 and a second connection section 420 which are fixedly connected to form the securing member 400. An end of the light source module 100 and the first magnetic attraction conductive member 210 are both located between the first connection section 410 and the second connection section 420, that is, the first connection section 410 and the second connection section 420 surround the first magnetic attraction conductive member 210 and the light source module 100 in different positions, respectively.

In the above technical solution, the assembly of the securing member 400 with the first magnetic attraction conductive member 210 and the light source module 100 is relatively less difficult, and the shape of the securing member 400 can be more fitted with the shape of the first magnetic attraction conductive member 210, which further improves the stability of the fit relationship between the first magnetic attraction conductive member 210 and the securing member 400. Specifically, a fixed connection can be formed between the first connection section 410 and the second connection section 420 by bonding or clamping. In this way, the securing member 400 has a detachable capacity so that the first magnetic attraction conductive member 210 and/or the light source module 100 can be repaired or replaced by disassembling the securing member 400 when the first magnetic attraction conductive member 210 or the light source module 100 fails.

In another example of the present application, the first connection section 410 and the second connection section 420 can also be fixedly connected by ultrasonic welding, that is, a non-detachable fixed connection is formed between the first connection section 410 and the second connection section 420. In the above technical solution, the first magnetic attraction conductive member 210 and the end of the light source module 100, together with a connection structure therebetween, such as conductive wires, can be packaged within the securing member 400, so as to preventing the user from accidentally opening the securing member 400 during the use of the lamp to cause damages of the connection structure between the first magnetic attraction conductive member 210 and the light source module 100 to damage the lamp, which can, on the one hand, prevent threatening the life and property safety of the user, and on the other hand prolong the service life of the lamp.

As noted above, the first sleeve 310 can be an integral structural member, which can improve the structural safety of the first sleeve 310. In this case, to ensure that the magnetic attraction power interface member 230 and the first magnetic attraction conductive member 210 can both be installed into the first sleeve 310, as noted above, the first sleeve 310 can be provided with an installation port through which the accommodation cavity 313 can communicate with the outside of the first sleeve 310. In this case, the magnetic attraction power interface member 230 and the first magnetic attraction conductive member 210 can both extend into the accommodation cavity 313 via the installation port, or extend out of the accommodation cavity 313 via the installation port.

Specifically, the shape and size of the installation port can be correspondingly determined in accordance with the shapes and sizes of the magnetic attraction power interface member 230 and the first magnetic attraction conductive member 210. In the case that the first sleeve 310 is provided with the securing member 400, the shape and size of the installation port can be correspondingly determined in accordance with the shape and size of the securing member 400. Optionally, the securing member 400 can be a cylindrical structural member, and correspondingly the installation port can be a circular hole-like structure.

Optionally, as shown in FIG. 1, a step section 311 is disposed within the accommodation cavity 313. The step section 311 faces the installation port, and the magnetic attraction power interface member 230 is in limit fit with the step section 311. The step section 311 can restrict the magnetic attraction power interface member 230 from moving in a direction away from the installation port. Moreover, an end of the magnetic attraction power interface member 230 away from the installation port is electrically connected to the power line 510. Under the action of the step section 311, the magnetic attraction power interface member 230 can be prevented from moving excessively away from the installation port, thereby ensuring that the power line 510 will not be squeezed, and ensuring that the power line 510 can form a stable connection with the magnetic attraction power interface member 230. Correspondingly, the threading hole 315 in the first sleeve 310 is also disposed in the region in which the step section 311 is located, thereby ensuring that the power line 510 can be interconnected with the magnetic attraction power interface member 230 installed within the first sleeve 310.

Specifically, the actual size of the step section 311 can be determined in accordance with actual conditions, such as the diameter of the power line 510 and the installation state. In the case that the accommodation cavity 313 is a cylindrical structure, the step section 311 can be a circular ring-like structural member, which can ensure that the limit fit relationship between the magnetic attraction power interface member 230 and the step section 311 is more stable.

Optionally, the first sleeve 310 can be a metal structural member, which can further enhance the structural strength of the first sleeve 310. In this case, as shown in FIG. 1, the lamp disclosed in the example of the present application can further comprise a flexible protective jacket 370 which is sleeved outside the power line 510, and inserted and fixed within the threading hole 315, thereby providing a good protection for the power line 510 by the flexible protective jacket 370, preventing the hole wall of the threading hole 315 of the first sleeve 310 from damaging the power line 510, improving the service life of the power line 510, and improving the safety of the lamp. Moreover, under the action of flexible protective jacket 370, a gap between the first sleeve 310 and the power line 510 can be decreased, thereby preventing external dusts, impurities, or the like from entering the first sleeve 310 through the aforesaid gap to pollute, or even damage the lamp.

The flexible protective jacket 370 can be made from a flexible material, such as rubber. The size of the flexible protective jacket 370 can be determined in accordance with the size of the power line 510 and the threading hole 315. The two opposite ends of the flexible protective jacket 370 can both be provided with a clamping section to ensure that the flexible protective jacket 370 can be stably installed at the position of the threading hole 315.

Optionally, the flexible protective jacket 370 is an insulation structural member. As noted above, it can be made from an insulation material, such as rubber, thereby further preventing the power line 510 from forming an electrical connection with the first sleeve 310 made of metal material and improving the safety of the lamp.

Optionally, the lamp can comprise a plurality of light source modules 100. On the one hand, the plurality of light source modules 100 can expand the illumination scope of the lamp; and on the other hand, the plurality of light source modules 100 can make the illumination effect of the lamp to be consistent in different regions and improve the uniformity of illumination. In the case that the lamp comprises a plurality of light source modules 100, the lamp can optionally further comprise a second magnetic attraction conductive member 220. As noted above, an end of the light source module 100 can be electrically connected to the first magnetic attraction conductive member 210, and correspondingly, the other end of the light source module 100 can be provided with the second magnetic attraction conductive member 220. In the case that a plurality of the light source modules 100 are used, two opposite ends of various light source modules 100 can be provided with the first magnetic attraction conductive member 210 and the second magnetic attraction conductive member 220, respectively, wherein the first magnetic attraction conductive member 210 and the second magnetic attraction conductive member 220 are magnetically attracted and electrically connected, so that a fixed and electrical connection can be formed between any two adjacent light source modules 100, ensuring that the plurality of the light source modules 100 can all normally operate.

The second magnetic attraction conductive member 220 and the first magnetic attraction conductive member 210 are components used as a set. Specifically, the shape and size of the second magnetic attraction conductive member 220 can be similar to the shape and size of the first magnetic attraction conductive member 210, wherein one of them can be a male, and the other one can be a female, which cooperate with each other to form a magnetic attraction and electrical connection. In addition, the magnetic attraction power interface member 230 can also be provided in two modes. One mode is that the magnetic attraction power interface member 230 is magnetically attracted and electrically connected to the first magnetic attraction conductive member 210, and the other mode is that the magnetic attraction power interface member 230 is magnetically attracted and electrically connected to the second magnetic attraction conductive member 220. Similarly, the second magnetic attraction conductive member 220 can be interconnected with the light source module 100 via a conductive wire.

Figure 6:
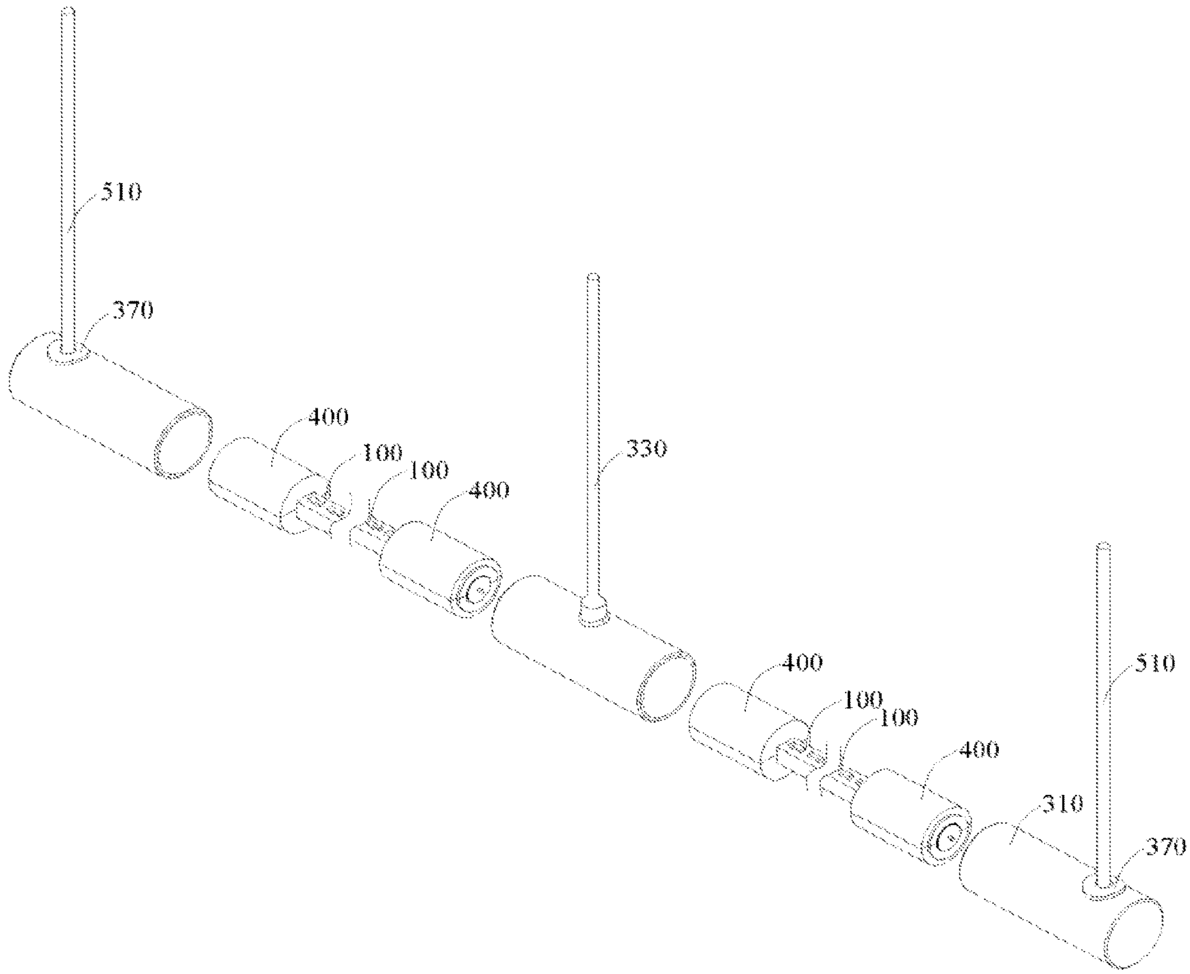
FIG. 6 is an exploded schematic view of a lamp disclosed in an example of the present disclosure.
Figure 7:
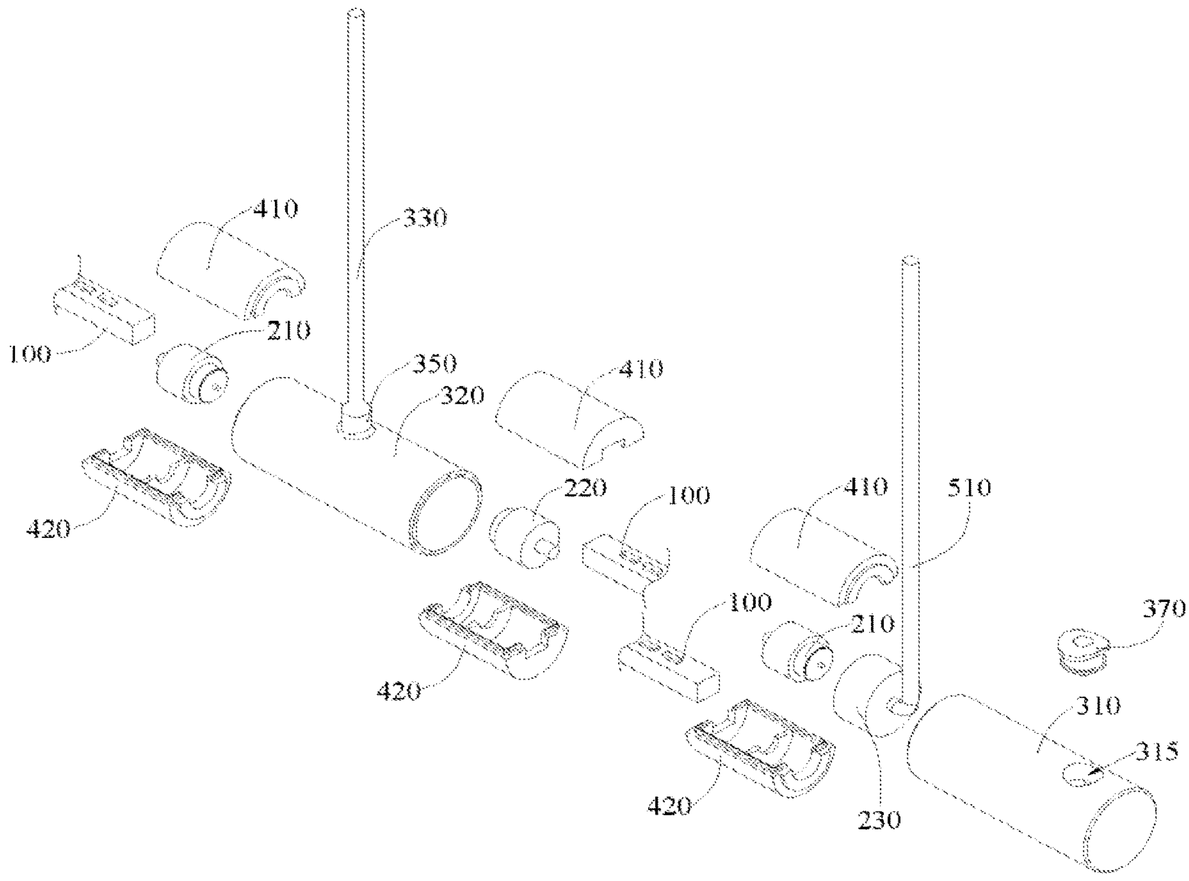
FIG. 7 is another exploded schematic view of the lamp disclosed in an example of the present disclosure.

Further, as shown in FIG. 6, the lamp disclosed in the present application can further comprise a second sleeve 320. In the case that a plurality of the light source modules 100 are provided, a second sleeve 320 can be disposed between any two adjacent light source modules 100. Similarly to the first sleeve 310, the second sleeve 320 can also be installed via threaded connection member to an installation basic structural member, such as roof, ceiling, or wall. The second sleeve 320 is also an installation member in the lamp. The first magnetic attraction conductive member 210 and the magnetic attraction power interface member 230 in magnetic attraction fit can be installed within the accommodation cavity 313 of the first sleeve 310. Then, both the first magnetic attraction conductive member 210 and the second magnetic attraction conductive member 220 in magnetic attraction fit can be installed within the second sleeve 320, and can rotate relative to the second sleeve 320 to ensure that the orientation of the light emitter 120 in the light source module 100 can be changed, and the light source module 100 can illuminate regions in different directions.

Similarly, the second sleeve 320 can also be a separable structure to ensure that the first magnetic attraction conductive member 210 and the second magnetic attraction conductive member 220 in magnetic attraction fit can be installed into the second sleeve 320, and can form a stable fit relationship with the second sleeve 320. By designing the internal size of the second sleeve 320 to be greater than the sizes of the first magnetic attraction conductive member 210 and the second magnetic attraction conductive member, it can ensure that the first magnetic attraction conductive member 210 and the second magnetic attraction conductive member 220 can both rotate within the second sleeve 320.

Or, in the case that the substrate 110 is a rigid structural member, similarly to the first sleeve 310, the second sleeve 320 can also be an integral structure, and at least one end of the second sleeve 320 can be provided with a hole-like structure similar to the installation port. The first magnetic attraction conductive member 210 and the second magnetic attraction conductive member 220 can both be installed into the second sleeve 320 via the above hole-like structure. By arranging the first sleeves 310 at the two sides of the second sleeve 320, in the case that the second sleeve 320 and the plurality of the first sleeves 310 are all installed to the installation basic structural member, it can ensure that neither the first magnetic attraction conductive member 210 nor the second magnetic attraction conductive member 220 will come out of the second sleeve 320. Of course, there are many ways to enable the first magnetic attraction conductive member 210 and the second magnetic attraction conductive member 220 to form a stable fit relationship with the second sleeve 320, they are not listed one by one, considering the brevity of text.

As noted above, a securing member 400 can be disposed within the first sleeve 310, which cooperates with the first magnetic attraction conductive member 210 and an end of the light source module 100. As noted above, two ends of the light source module 100 can be provided with the first magnetic attraction conductive member 210 and the second magnetic attraction conductive member 220, respectively, wherein securing members 400 can be disposed outside the end of the light source module 100 connected to the first magnetic attraction conductive member 210 and the first magnetic attraction conductive member 210; and optionally, securing members 400 can also be disposed outside the end of the light source module 100 connected to the second magnetic attraction conductive member 220 and the second magnetic attraction conductive member 220. That is, an end of the light source module 100 and the first magnetic attraction conductive member 210 are fixed within one securing member 400, and an end of the light source module 100 and the second magnetic attraction conductive member 220 can also be fixed within another securing member 400. As noted above, the first magnetic attraction conductive member 210 and the second magnetic attraction conductive member 220 in magnetic attraction connection can both be disposed within the second sleeve 320. Correspondingly, two securing members 400 can be disposed within the second sleeve 320, one of which is connected to the first magnetic attraction conductive member 210, and the other is connected to the second magnetic attraction conductive member 220. Both of the two securing members 400 can rotate relative to the second sleeve 320 to change the orientation of the light source module 100. Moreover, under the action of the two securing members 400, the assembly of the lamp can be modularized to reduce the assembly difficulty of the lamp and improve the assembly efficiency of the lamp.

In addition, the securing member 400 in the above example can comprise two parts, which surround outside of the first magnetic attraction conductive member 210 or outside of the second magnetic attraction conductive member 220 in different positions, respectively. A fixed connection can be formed between the two parts via ultrasonic welding to prevent the connection between the light source module 100 and the first magnetic attraction conductive member 210 and the second magnetic attraction conductive member 220 from being destroyed. Optionally, the first magnetic attraction conductive member 210 and the second magnetic attraction conductive member 220 have similar shapes and the same sizes. In this case, it is required to provide only one type of securing member 400. This securing member 400 can cooperate with both the first magnetic attraction conductive member 210 and second magnetic attraction conductive member 220, which can further reduce the assembly difficulty of the lamp and improve the assembly efficiency of the lamp.

Under the action of disposing two securing members 400 within the second sleeve 320, a stop rib 321 is optionally disposed within the second sleeve 320. The two securing members 400 within the second sleeve 320 are both in limit fit with the stop rib 321, that is, one side of the stop rib 321 is provided with a securing member 400, and another securing member 400 is also provided at the other side of the stop rib 321. By the stop rib 321 restricting the positions of the two securing members 400 to prevent one securing member 400 from extending into one side of the second sleeve 320 and extending out of the other side of the second sleeve 320, it further improves the stability of the whole structure of the lamp.

Specifically, the stop rib 321 can be a ring-like structural member, and can be integrated with the second sleeve 320. In the case that the second sleeve 320 comprises a plurality of parts, any part can be provided with a portion of the stop rib 321 to form the ring-liked stop rib 321. Or, the stop rib 321 can also be a bar-like structural member. By arranging a plurality of stop ribs 321 surroundingly distributed, it can improve the limit effect of the stop rib 321.

Optionally, the second sleeve 320 is an integral structural member, which can enhance the structural strength of the second sleeve 320. In this case, at least one end of the second sleeve 320 is provided with through hole, which plays the same role as that of the installation port of the first sleeve 310. The magnetic attraction power interface member 230 and the first magnetic attraction conductive member 210 in magnetic attraction fit can both be installed into the accommodation cavity 313 of the first sleeve 310 via the installation port, and the first magnetic attraction conductive member 210 and the second magnetic attraction conductive member 220 in magnetic attraction fit can both be installed into the second sleeve 320 via the through hole.

In the case that a securing member 400 is disposed within the second sleeve 320, the securing member 400 can be installed into the second sleeve 320 via the through hole, and correspondingly, the securing member 400 can also extend out of the second sleeve 320 via the through hole, so as to complete the assembly and disassembly of the lamp. In the case of using the above technical solution, as noted above, the first sleeves 310 can be disposed at two sides of any second sleeve 320, respectively. During the operation of the lamp, by installing both the second sleeve 320 and the plurality of the first sleeves 310 to the installation basic structural member, it can prevent the securing member 400 from coming out of the installation port of the first sleeve 310, and prevent the securing member 400 from coming out of the through hole of the second sleeve 320, ensuring a good integrity of the lamp structure.

Further, in the case that a stop rib 321 is disposed within the second sleeve 320, two opposite ends of the second sleeve 320 can both be provided with through holes so that the two securing members 400 can be installed into the second sleeve 320 via the two through holes, respectively, and be in limit fit with the stop rib 321 within the second sleeve 320.

In the case that the lamp comprises the second sleeve 320, the lamp can further comprise an installation member 330, the second sleeve 320 is provided with an installation section 350, wherein the installation member 330 is fixedly connected to the installation section 350, and the installation member 330 can be fixedly connected to the installation basic structural member. In the above technical solution, the second sleeve 320 can be indirectly installed to the installation basic structural member via the installation section 350 and installation member 330, which can reduce the installation difficulty of the second sleeve 320, and can flexibly determine the specific structure of the installation member 330 in accordance with the installation position of the lamp so as to expand the range of application.

Specifically, as shown in FIG. 6, the installation member 330 can specially be a member, such as installation base or hanging wire. The installation member 330 and the installation section 350 can be connected together by magnetic connection, clamping, or connector. The installation member 330 can be fixed to the installation basic structural member such roof or ceiling by clamping or connector connection. Or, the installation member 330 can be indirectly connected to the installation basic structural member via other structural members, which is not limited here.

Optionally, the installation member 330 is a hanging bar. The installation member 330 and the installation section 350 are in threaded connection. During the installation of the lamp, the second sleeve 320 can be threadedly connected with the the installation member 330 to be a whole member via the installation section 350, and then the installation member 330 is installed to the installation basic structural member, such as roof or ceiling. By connectors, such as rivets or expansion screws, a stable connection can be formed between the installation member 330 and the installation basic structural member. Or, an installation base can be provided, which can be fixed to the installation basic structural member, such as roof, via expansion screws. By clamping or connector connection, the installation member 330 can be installed onto the installation base so that the installation of the lamp can be finished.

Specifically, the installation section 350 can be provided with an internal thread, the installation member 330 can be provided with an external thread, and the installation member 330 extends into the installation section 350 and be in threaded connection with the installation section 350. Of course, the installation member 330 can also be provided with an internal thread, and the installation section 350 is provided with an external thread, which is not limited here.

In the case of using the above technical solutions, each second sleeve 320 can form a stable connection with the installation basic structural member via the installation member 330 and the installation section 350. Optionally, the first sleeve 310 can be provided with a structure similar to the installation member 330 and the installation section 350. Or, the first sleeve 310 can form a certain connection with the installation basic structural member via the power line 510. In the case that each second sleeve 320 is interconnected with the installation basic structural member, a major weight of the lamp can act on the installation basic structural member via the installation member 330 and the installation section 350 so that the interaction force between the first sleeve 310 located at the end of the lamp and the installation basic structural member is relatively small, and thus the action force to be borne by the power line 510 is also relatively small, which will not adversely affect the structure of the power line 510 and can ensure that the power line 510 has a service life meeting the requirement. Of course, to further prevent the power line 510 from damage, a connection structure, such as slings, can be disposed between the first sleeve 310 and the installation basic structural member, which can improve the connection reliability between the first sleeve 310 and the installation basic structural member.

Figure 8:
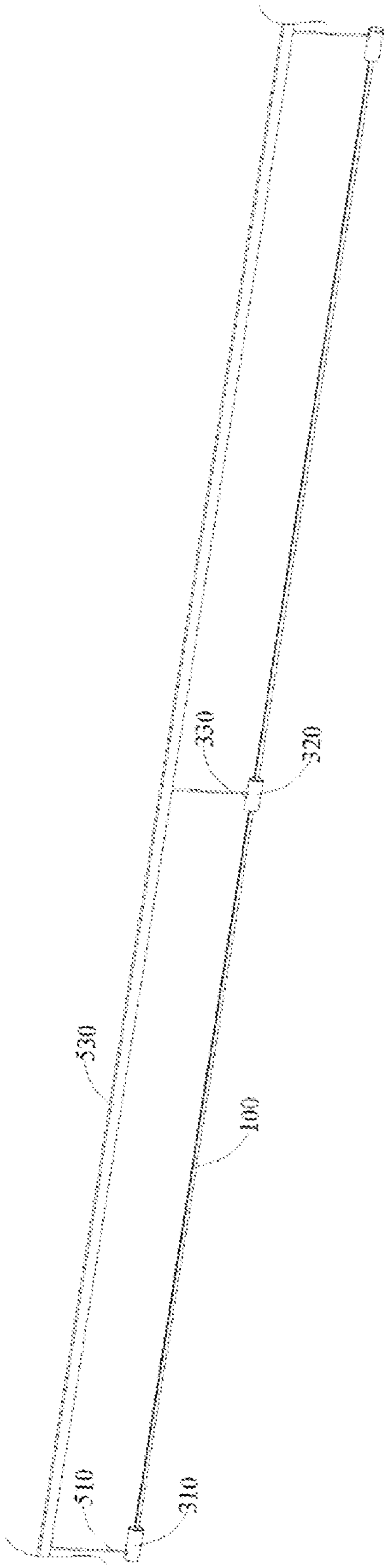
FIG. 8 is a schematic structural view of a structure of a lamp disclosed in an example of the present disclosure.

As noted above, the first sleeve 310 and the second sleeve 320 can also be installed to the installation basic structural member via other structural members. Optionally, as shown in FIG. 8, the lamp disclosed in the example of the present application further comprises a conductive rail 530. The power line 510 slides via a conductive sliding block and is electrically connected with the conductive rail 530. The conductive rail 530 is configured to be connected with the electric supply. In the above technical solution, the conductive rail 530 is electrically connected to the conductive sliding block so that the power line 510 can be connected to the electric supply via the conductive sliding block and the conductive rail. In the case that a conductive rail 530 is provided, the position of the light source module 100 can be flexibly changed in accordance with requirements by moving the conductive sliding block, thereby further improving the user's experience for the lamp.

In addition, a sliding fit relationship can also be formed between the second sleeve 320 and the conductive rail 530. As noted above, the second sleeve 320 can be interconnected with installation basic structural member via the installation member 330 and the installation section 350. Further, the installation member 330 can form a sliding fit relationship with the conductive rail 530, and the installation member 330 and the conductive rail 530 can be insulated from each other to prevent the installation member 330 from being electrically charged and improve the safety of the lamp.

The present disclosure discloses a lamp to solve the problems of ceiling washer lamps that the orientation or angel cannot be adjusted, the lighting effect is monotonous, and the user experience is poor.

To address the aforesaid problems, the present disclosure use the following technical solutions:

The present disclosure discloses a lamp comprising:

a light source module comprising a substrate and a light emitter connected to a side of the substrate;

a first magnetic attraction conductive member electrically connected to an end of the light source module;

a magnetic attraction power interface member configured to be electrically connected to a power line and magnetically and electrically connected to the first magnetic attraction conductive member;

a first sleeve configured to be installed on an installation basic structural member and provided with an threading hole for threading the power line and an accommodation cavity, wherein the magnetic attraction power interface member and the first magnetic attraction conductive member are both installed within the accommodation cavity, and the first magnetic attraction conductor being capable of rotating relative to the first sleeve in a direction about the magnetic attraction direction.

The technical solutions utilized in the present disclosure can achieve the following beneficial effects:

An example of the present application discloses a lamp in which an electrical connection can be formed between a light source module and a power line through a magnetic attraction and electrical connection between a first magnetic attraction conductive member and a magnetic attraction power interface member, and the first magnetic attraction conductive member and the magnetic attraction power interface member are both installed within the accommodation cavity of the first sleeve, and the first sleeve can be installed on the installation basic structural member, so that the installation of the lamp is completed. Moreover, the first magnetic attraction conductive member can rotate relative to the first sleeve in a direction about the magnetic attraction direction to change the orientation of a light emitter of the light source module connected to a side of the substrate, thereby changing the orientation of the light emitter by allowing the first magnetic attraction conductor to rotate relative to the first sleeve if the user needs to adjust the light effect of the lamp, which allows user to have a good experience.

The above examples of the present disclosure focuses on the differences among various examples. The different optimization features among the examples can be combined to form a better example as long as they are not contradictory. Considering the brevity of the writing, it is not iterated here.

The foregoing shows only examples of the present disclosure, and not used to limit the present disclosure. Various modifications and variations can be made to the present disclosure for those skilled in the art. Any modification, equivalent substitution, improvement, and the like made within the spirit and principle of the disclosure should be encompassed within the scope of the disclosure.

What is claimed is:

1. A lamp, comprising:

a light source module comprising a substrate and a light emitter connected to a side of the substrate;

a first magnetic attraction conductive member electrically connected to an end of the light source module;

a magnetic attraction power interface member configured to be electrically connected to a power line, and magnetically and electrically connected to the first magnetic attraction conductive member; and a first sleeve configured to be disposed on an installation basic structural member and provided with a threading hole for threading the power line and an accommodation cavity, wherein both the magnetic attraction power interface member and the first magnetic attraction conductive member are installed within the accommodation cavity, and the first magnetic attraction conductive member is capable of rotating relative to the first sleeve in a direction about the magnetic attraction direction.

2. The lamp according to claim 1, wherein the lamp further comprises a securing member, both the end of the light source module connected to the first magnetic attraction conductive member and the first magnetic attraction conductive member are fixed within the securing member, and the securing member is rotatably installed within the accommodation cavity.

3. The lamp according to claim 2, wherein the securing member and the accommodation cavity are both cylindrical structures, and the securing member is in clearance fit with the accommodation cavity.

4. The lamp according to claim 2, wherein the securing member comprises a first connection section and a second connection section, and the first connection section and the second connection section are fixedly connected, and the end of the light source module and the first magnetic attraction conductive member are both located between the first connection section and the second connection section.

5. The lamp according to claim 1, wherein the lamp further comprises a second magnetic attraction conductive member, a plurality of the light sources module are provided, an end of each light source module is provided with the first magnetic attraction conductive member, the other end of each light source module is provided with the second magnetic attraction conductive member, and any two adjacent light source modules are magnetically attracted and electrically connected with each other via the first magnetic attraction conductive member and the second magnetic attraction conductive member.

6. The lamp according to claim 5, wherein a second sleeve is disposed between any two adjacent light source modules, the second sleeve is installed to the installation basic structural member, and the first magnetic attraction conductive member and second magnetic attraction conductive member in magnetic attraction fit are rotatably installed within the second sleeve.

7. The lamp according to claim 6, wherein the lamp further comprises securing members, two securing members are disposed and rotatably installed within the second sleeve, an end of the light source module connected to the first magnetic attraction conductive member and the first magnetic attraction conductive member are both fixed within one of the two securing members, and an end of the light source module connected to the second magnetic attraction conductive member and the second magnetic attraction conductive member are both fixed within the other one of the two securing members.

8. The lamp according to claim 7, wherein a stop rib is disposed within the second sleeve, and the two securing members the second sleeve are both in limit fit with the stop rib.

9. The lamp according to claim 7, wherein the second sleeve is an integral structural member, at least one end of the second sleeve is provided with a through hole through which the securing member can extend into or out of the second sleeve.

10. The lamp according to claim 6, wherein the lamp comprises an installation member, the second sleeve is provided with an installation section, and the installation member is fixedly connected to the installation section and configured to be fixedly connected to the installation basic structural member.

11. The lamp according to claim 1, wherein the first sleeve is an integral structural member, the first sleeve is further provided with an installation port, the accommodation cavity communicates with the outside of the first sleeve via the installation port, and the magnetic attraction power interface member and the first magnetic attraction conductive member can both extend into the accommodation cavity or extend out of the accommodation cavity via the installation port.

12. The lamp according to claim 11, wherein a step section is disposed within the accommodation cavity and faces the installation port, the magnetic attraction power interface member and the step section are in limit fit, the step section is used to restrict the magnetic attraction power interface member from moving in a direction away from the installation port, and an end of the magnetic attraction power interface member away from the installation port is configured to be electrically connected to the power line.

13. The lamp according to claim 1, wherein the first sleeve is a metal structural member, the lamp further comprises a flexible protective jacket which is sleeved outside the power line and inserted and fixed into the threading hole.

14. The lamp according to claim 13, wherein the flexible protective jacket is an insulation structural member.

15. The lamp in accordance with claim 1, wherein the lamp further comprises a conductive rail, the power line slides via a conductive sliding block and is electrically connected to the conductive rail, and the conductive rail is configured to be connected to electricity supply.

* * * * *